United States Patent [19]

Hayes

[11] Patent Number: 5,683,093

[45] Date of Patent: Nov. 4, 1997

[54] DEVICE ATTACHABLE TO A BICYCLE TO ALLOW STABILIZING OF A LEARNING RIDER

[75] Inventor: Gary Hayes, Largo, Md.

[73] Assignee: Bike-Rite USA, Inc., Hanover, Pa.

[21] Appl. No.: 621,275

[22] Filed: Mar. 25, 1996

[51] Int. Cl.[6] .................................................. B62H 1/00
[52] U.S. Cl. ........................................................ 280/293
[58] Field of Search .......................... 280/288.4, 292, 280/293, 296, 304.5

[56] References Cited

U.S. PATENT DOCUMENTS

| | | | |
|---|---|---|---|
| 4,903,975 | 2/1990 | Weisbrodt et al. | 280/293 |
| 4,917,398 | 4/1990 | de Miranda Pinto | 280/293 |
| 5,154,096 | 10/1992 | Geller et al. | 280/293 X |
| 5,259,638 | 11/1993 | Krauss et al. | 280/293 |
| 5,303,944 | 4/1994 | Kalmus | 280/293 |
| 5,338,204 | 8/1994 | Herndon | 280/293 X |
| 5,395,130 | 3/1995 | Rubin | 280/293 X |
| 5,407,222 | 4/1995 | Harrison | 280/293 |
| 5,487,554 | 1/1996 | May | 280/293 |
| 5,564,726 | 10/1996 | Hearn et al. | 280/293 |

FOREIGN PATENT DOCUMENTS 2830561  1/1980  Germany ................................. 280/293

*Primary Examiner*—Kevin Hurley
*Attorney, Agent, or Firm*—Lowe, Price, LeBlanc & Becker

[57] ABSTRACT

A device is provided which is readily mountable to the rear axle and frame of a bicycle and provides a graspable distal end to be held by a person walking or running alongside or just behind a bicycle on which another person is learning how to ride. The device includes three substantially tubular elements connected to each other by a single bolt, washer and nut assembly, and the entire device is mounted in a three-point manner to the bicycle thereby ensuring a strong rigid connection thereto. In one aspect of the invention, the person helping stabilize the rider grasps a suitably textured grip aligned with the plane of the bicycle frame. In another aspect of the invention, one particularly suitable for use by children or when the person learning to ride the bicycle is rather heavy, a pair of grips are mounted transversely of the plane of the bicycle to facilitate a two-handed grasping of the device by the helper.

5 Claims, 5 Drawing Sheets

DEVICE ATTACHABLE TO A BICYCLE TO ALLOW STABILIZING OF A LEARNING RIDER

FIELD OF THE INVENTION

This invention relates to a device to enable a person walking or running alongside a bicycle to provide stability and support to another person learning to ride the bicycle, and more particularly to a sturdy but inexpensive device which easily attaches at three points to the rear portion of a conventional bicycle ranging in size from one suitable for very small children to one suitable for adults.

BACKGROUND OF THE RELATED ART

Most people learn to ride a bicycle at an early age, although occasionally there are people who learn as adults. Most children, or adults, initially need some support until they develop a sense of balance and can learn to start, turn, and stop without falling over and possibly hurting themselves.

One solution, particularly suitable for young children, is to attach a pair of so-called "training wheels", one on either side of the rear wheel of the bicycle. Such training wheels are typically individually supported rotatably on respective arms attached to and depending downwardly of the rear axle of the bicycle. They are thus spaced apart from the rear wheel of the bicycle but normally are not capable of touching the ground until the bicycle leans over sufficiently, at which point it effectively becomes a tricycle with ground contact obtained by one of the training wheels and the two wheels of the bicycle.

While such training wheels are satisfactory for young children, older children and adults generally do not find them acceptable. There is also the likelihood that a young child on a bicycle provided with training wheels may wander away from adult supervision before having acquired sufficient proficiency and confidence, and may encounter circumstances in which even the training wheels fail to provide the desired stability and support. Consequently, there has long existed a need for a device which a parent or other responsible person (a "helper") could readily attach to a learner's bicycle and walk rapidly or run alongside or behind the bicycle to provide carefully calibrated stability and support. The helper can provide verbal encouragement to the learner and remain in close proximity to be available to assist if a mishap is threatened or occurs.

In principle, the desired device should be simple, i.e., it should involve very few individual components and should not require special tools or skills to attach or detach it from a bicycle once the learner has completed the learning task and no longer needs assistance. The device should also be sturdy enough to survive all anticipated physical abuse. It should also be quite inexpensive and capable of fitting to bicycles of varying sizes, because most learners will learn within a relatively short time and the device thereafter will not be actively needed. Most important, the device must be one which does not subject the helper to any unacceptable physical stress, yet must enable the helper and the learner to cooperate with minimum interference by the helper as the learner advances from the status of a total novice to one who can safely attempt least a reasonable variety of maneuvers as part of the overall learning process before dispensing with the helper's active involvement.

Numerous devices have been proposed to meet these needs.

One is disclosed in U.S. Pat. No. 4,903,975, to Weisbrodt et al, titled "Rear Bicycle Attachment Handle", and includes two vertical elongated strip-like attachment members with a hard transverse rubber-like handle positioned horizontally between their upper portions, and a similar elongate strip-like vertical support member positioned between lower sections of the two attachment members with two hard rubber-like spacer bars and an elongate support bolt connecting to the two attachment members and to the typical seat adjustment bolt section of the bicycle frame. Because of the need for bolting together flat strip-like elements, and because of the manner in which the support member is attached to the attachment members, this device involves numerous cooperating elements and the presence of the rubber-like material probably incorporates a certain structural looseness in the device when it is attached to the bicycle for use.

U.S. Pat. No. 4,917,398, to de Miranda Pinto, titled "Bicycle Training Handle", provides a telescoping combination of a handle and an extension member pivotally mounted to the rear axle, deliberately designed to provide some pivoting motion limited by elements mounted near the rear axle. The device has a handle apparently to be gripped by the helper between the rear axle and the bicycle seat. In one of its embodiments, this device includes a slotted element of adjustable length connectable to the seat adjustment bolt.

Yet another device is taught in U.S. Pat. No. 5,303,944, to Kalmus, titled "Bicycle Riding Training Device", which provides a telescopic elongate handle connectable at a selected angle from an attachment means clamped to the seat post of the bicycle above the bicycle frame itself. This device is not connected to the bicycle frame or to the rear axle.

The present invention is aimed at meeting all of the desirable criteria for such a device, namely sturdiness, simplicity of structure, low cost, ease of attachment and detachment, and strong rigid connection to the bicycle frame to enable the helper to provide finely-calibrated and well-directed support without suffering physical stress.

SUMMARY OF THE DISCLOSURE

It is a principal object of this invention to provide a device readily attachable to the rear wheel and frame of a bicycle, to enable a helper to walk or run alongside or behind the bicycle to provide controlled stability and support to another person learning to ride the bicycle.

Another object of this invention is to provide an inexpensive, simple, sturdy, and securely attachable device which can be fitted to a bicycle and can be grasped by a helper to provide carefully-calibrated and properly-directed support to stabilize another person who is learning to ride a bicycle.

These and other related objects of the invention are realized by providing a device attachable to the bicycle to enable a helper walking or running alongside or behind the bicycle to provide stability and support to a rider learning to ride the bicycle. The device includes a first element with a pair of arms having distal ends formed to attach to a rear axle of the bicycle and an oppositely directed connection arm. A second element has a first end formed to attach to the bicycle beneath a seat thereof, and a second end formed to attach to the connection arm of the first element. A third element has a connection end formed to attach to the connection arm of the first element and a graspable distal end which may be grasped by the helper during use of the device.

In one aspect of the invention, all of these elements are formed of drawn steel tubing to optimize rigidity and strength while minimizing the material and manufacturing costs and each is provided a durable attractive finish to ensure compatibility with the form and appearance of the typical bicycle.

These and other aspects of the present invention will be better understood with reference to the detailed description and the drawing figures provided herewith.

DETAILED DESCRIPTION OF THE PREFERRED EMBODIMENTS

Figure 1:
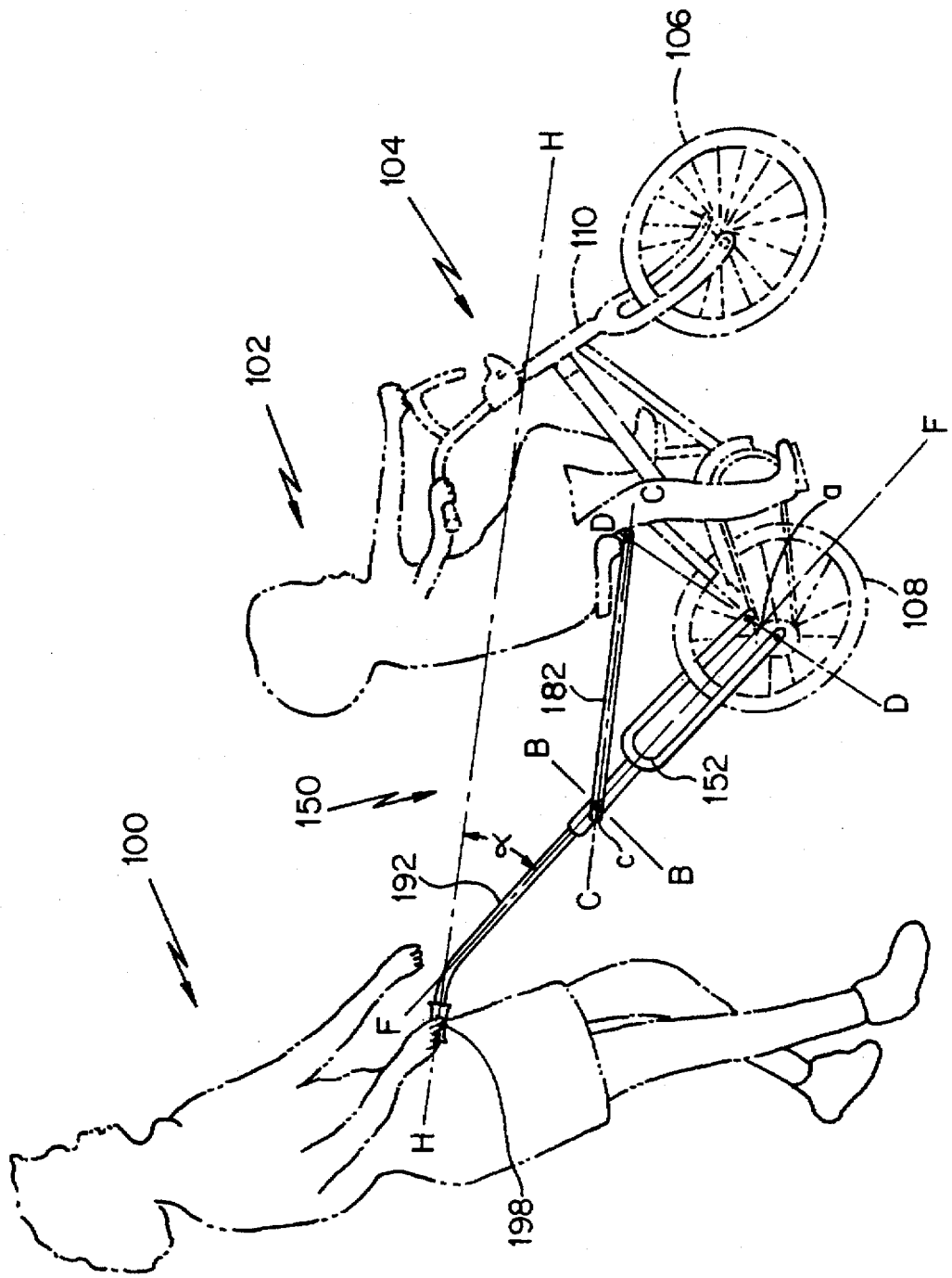
FIG. 1 is a schematic perspective view of a bicycle, a child learner, and a female adult helper all shown in chain lines, with a preferred embodiment of the invention shown in solid lines with all principal axes identified.

As best seen in FIG. 1, a highly likely use of the present invention will involve its attachment to the rear portion of a bicycle on which a relatively young child is learning how to ride with the assistance of an adult helper. In such a circumstance, with relatively small bicycle wheels, the adult helper very likely will be grasping the device to the rear of the bicycle, and will be able to provide a forwardly directed force along axis H—H which lies substantially in the plane of the bicycle frame and passes through about the mid-portion of the child learner while also providing lateral support to prevent tipping over of the bicycle. It is believed that this alignment, as an initial matter, imposes the least stress on helper 100 stabilizing learner 102 on bicycle 104 which has front and rear wheels 106, 108 and a frame 110.

The device 150 will now be described in greater detail with reference to the other drawing figures.

As noted earlier, the present invention is intended to be simple to make and use, inexpensive and therefore affordable, and of sturdy steel components which connect to each other and to the bicycle quickly and strongly. The device itself has as one of its principal components a first element 152 formed of a U-shaped length of drawn steel tubing to provide to substantially parallel arms 154, 154 which, in use, would be oriented downward while the curve of the U-shape extends over and brackets an upper portion of rear wheel 108 of the bicycle 104 to which it is attached. At the outside center of the curved part of the U-shaped portion 152 is butt-welded a length of tubing 156 of the same kind. The welding 158 may be performed in a manner known in the bicycle-building art, and the tubing may also be of a kind known in this art. It is preferable, but not essential, that the tubing 156 be welded to be coplanar with the U-shaped tubing 152.

Tubing 156 ends in an opening 160 which should preferably be finished so that it does not have sharp edges. Intermediate opening 160 and butt-weld 158 there is provided a diametral hole 162 along an axis B—B which is preferably in the plane of arms 154, 154 of element 152. Axis F—F is the axis of tubing 156 and preferably is an axis of symmetry for the U-shaped tubing 152.

Arms 154, 154 are each pressed flat at their lower distal ends in a manner well-known in the bicycle-making art, to produce flat end portions 164, 164 into which are formed open slots 166, 166 each of a width sufficient to slidingly receive therein the rear axle of the bicycle to which the device is to be fitted. The rear axles of most bicycles, regardless of the sizes of the wheels mounted thereon, are about the same in diameter, hence the device should be operable with a very wide range of bicycles. A preferred width for slots 166, 166 is in the range 5/16–7/16 in. Furthermore, just inboard of slots 166, 166, there are provided respective apertures 168, 168 the flattened portions 164, 164. The purpose in doing so is best understood with reference to FIG. 6 which explains the preferred manner of attaching the U-shaped element 152 to the rear axle of the bicycle.

Figure 6:
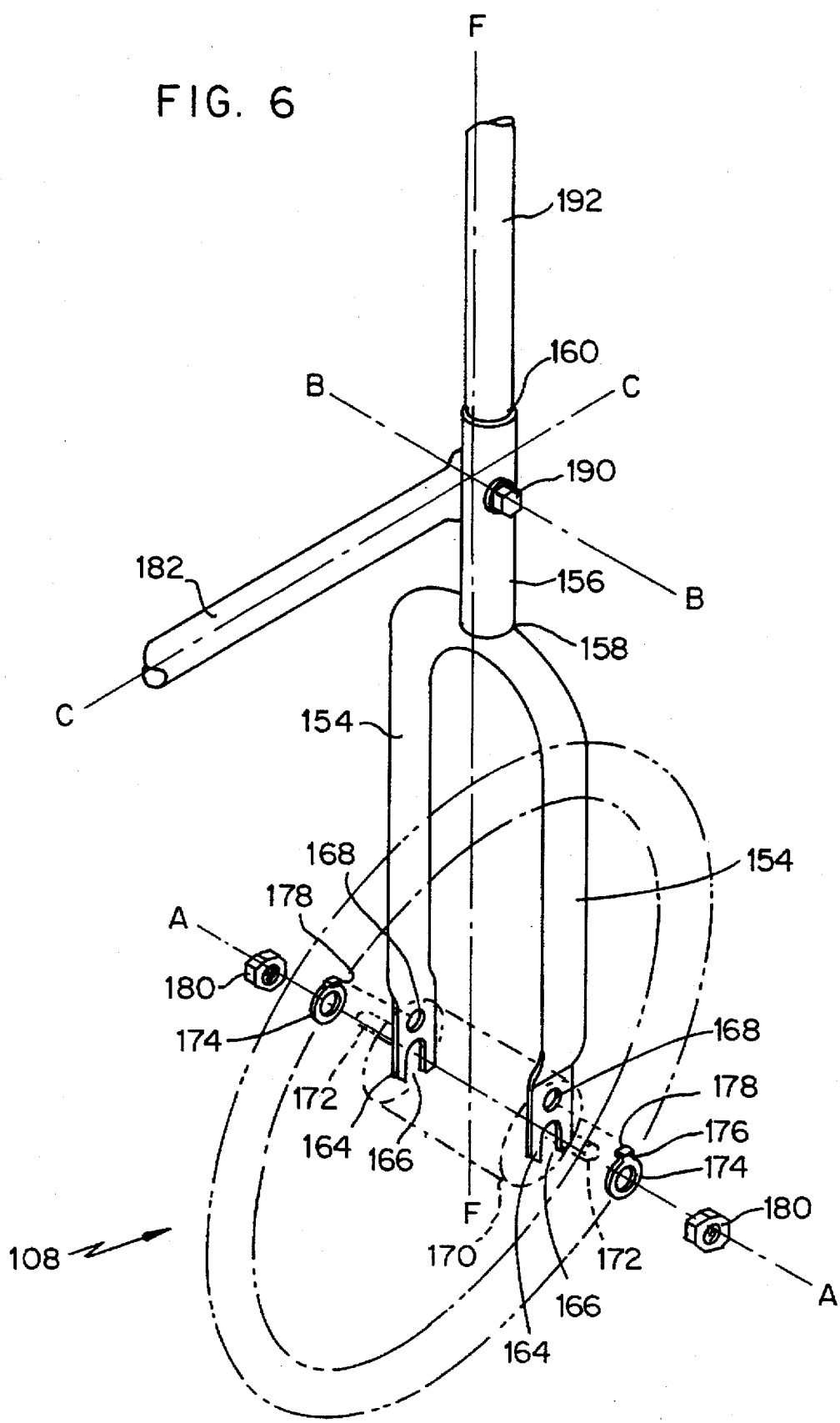
FIG. 6 is a partial perspective exploded view including significant components of the claimed invention and the rear wheel of a bicycle shown in chain lines to illustrate how the device may be securely connected to the rear axle of the bicycle.

As seen in FIG. 6, the typical bicycle wheel 108 has a central hub 170 from which spokes (not shown) connect to a rim of the wheel. The wheel 108 and hub 170 during use both rotate about a generally horizontal axis A—A central to a rear wheel axle 172 which is externally threaded at both ends and passes through rear portions of the bicycle frame (not shown in FIG. 6 for simplicity). As noted earlier, slots 166, 166 are sized to fit over the ends of axle 172. Conventional retaining washers 174, 174 are then slid over the threaded ends of axle 172 on both sides. Each retaining washer 174 has a conventional annular portion and, in addition, a radially extended portion 176 with a bent end 178. As will be readily understood from FIG. 6, once the bent end 178 of retaining washer 174 is slid into aperture 168 with axle 172 passing through the circular annular portion 174, the axle 172 cannot be drawn along and out of the slots 166, 166 until and unless both the retaining washers 174, 174 are slid outwardly along axis A—A. Such slipping away is prevented by the provision of two internally threaded conventional nuts 180, 180 which, when tightened in place, cause the inside surfaces of flat portions 164, 164 to press against the outside end portions of the bicycle frame (not shown) on opposite sides of hub 170 of wheel 108. The coaction of the threaded nuts 180, 180 with the threads on axle 172 helps to retain the bent portions 178, 178 in respective apertures 168, 168 and thereby element 152 is retained to the rear axle 172. Threaded nuts 180, 180 may be the nuts used on the bicycle itself to hold rear axle 172 to the bicycle frame.

Figure 2:
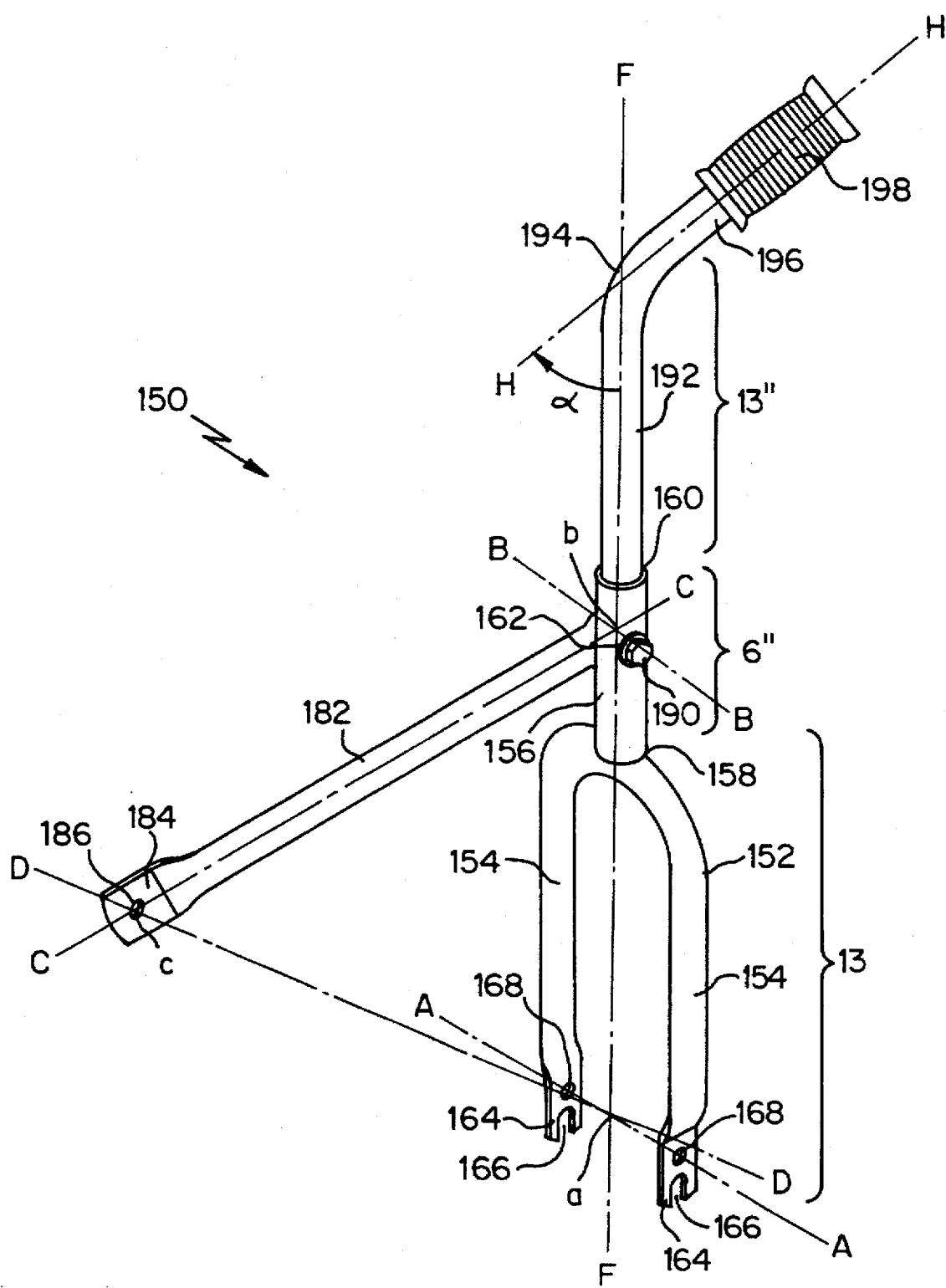
FIG. 2 is a perspective view of only the preferred embodiment of the invention per FIG. 1.

The second principal element of the device is connecting element 182 which, in the preferred embodiments, is a straight length of drawn steel tubing flattened at both ends to have flats 184, 184 into which are formed holes 186, 186. Element 182 is connected at one of its holes 186 to the typical bolt (not shown) by which an upper portion of the bicycle frame clamps to the conventional seat post to which the seat is mounted. This is generally indicated in FIG. 1 and the other figures. The center of this particular hole 186 is at the intersection of axis C—C, which extends along element 182 and axis D—D, which passes through the center of rear axle 172 where it intersects axis A—A of the rear axle and axis F—F which is the axis of symmetry of U-shaped element 152. The other end of connecting element 182 is connected to tubing 156 of the first element by a conventional bolt, washer and nut assembly 190, with the bolt passed through hole 162 along axis B—B (best seen in FIGS. 2 and 3).

Within the manufacturing tolerances for such elements, axes B—B and F—F intersect very close to axis C—C. They do not all intersect in exactly the same point because flat portion 184 of element 182 is outside and does not pass through the central axis F—F of straight tubing 156.

As will be readily appreciated by persons of ordinary skill in the mechanical arts, the above-described connection actually involves three "three-point" connections, as follows. First, the rear axle 172 is connected through and at each of the spaced-apart slots 166, 166 and the bolt at 190 provides the third point in a three-point connection for the first element mounted above the rear axle 172 to bracket the rear wheel 108. Second, the two connections between axle 172 and slots 166 and 166 on opposite sides thereof, and a third point which is the center of hole 186 under the bicycle seat forms another three-point connection which is, in effect, inherently built into the bicycle frame. Third, the intersection of axes A—A, D—D, and F—F, is a first point "a"; the intersection of axes B—B and F—F is a second point "b"; and the intersection of axes C—C and D—D is a third point "c", which together form another three-point connection, this one being formed by the first and second elements of the device connected to the bicycle frame. As is well understood, a triangular array of cooperating elements provides the optimum stability with a minimum number of elements. This principle is fully exploited in this invention.

The third principal element of the device is the handle-arm 192 which also is preferably formed of drawn steel tubing having an outside diameter slightly smaller than an inside diameter of straight tubing 156 so as to be slidably receivable therein. Third element 192 is formed to have an elbow 194 so that a short length 196 extends at an angle "α" along an axis H—H at the distal end of which, in the preferred embodiment, there is provided a single contoured and textured grip 198 preferably made of a colorful, somewhat flexible material, e.g., a plastic or rubber, of a type similar to that used on bicycle handle grips.

As will be readily appreciated, third element 192 is provided with a diametral hole (not shown) of a size and at a location suitable for passage therethrough of the bolt, washer and nut assembly 190 which simultaneously passes through the first element 152 and second element 182. In this manner, by the provision of a single bolt at 190 it becomes possible to strongly and mutually interconnect the first, second and third elements 152, 182 and 192. Note that the above-discussed connection is obtained so that the plane of intersection of axes F—F and H—H is perpendicular to the plane of the U-shaped portion of the first element and is coincident with the plane of the frame of the bicycle itself (as best seen in FIG. 1).

The angle "α" should be selected so that the portion 196 third element 192 is aligned along axis H—H oriented along the plane of the bicycle and passing through about the mid-portion of the learner riding the bicycle. Obviously, when the device is employed on different sized bicycles axis H—H will correspondingly change its inclination relative to the ground. Note, however, that the radial difference between bicycles having wheels of 16 in. diameter or 26 in. diameter is only 5 in. Given the length of even a small bicycle, the change in inclination of axis H—H will be minimal, hence a helper assisting a learner on a small bicycle or a large bicycle will not experience significant differences in the orientation or height (relative to the ground) of grip 198 by which the helper provides the required stabilizing force. This lack of sensitivity to bicycle size is actually a major advantage of the present device over the deliberately adjustable, more complicated and undoubtedly more expensive devices taught in the prior art, some examples of which are discussed earlier in this application.

In summary, the present device in its entirety includes first element 152, second element 182, third element 192, two retaining washers 174, 174 and a bolt, washer and nut assembly 190. The bolt to attach second element 182 to the bicycle frame already exists at the clamping portion of the frame where the seat post is clamped to the bicycle, and nuts 180,180 already exist to retain the axle 172 of the rear wheel to the bicycle frame. Thus, with a bare minimum of elements there is provided a strong device which fully utilizes the inherent lightness and strength of tubular structures to ensure multiple three-point attachment to the bicycle frame, with the grip 198 provided in the plane of the bicycle and at a height and angular disposition which is relatively insensitive to bicycle size.

Figure 3:
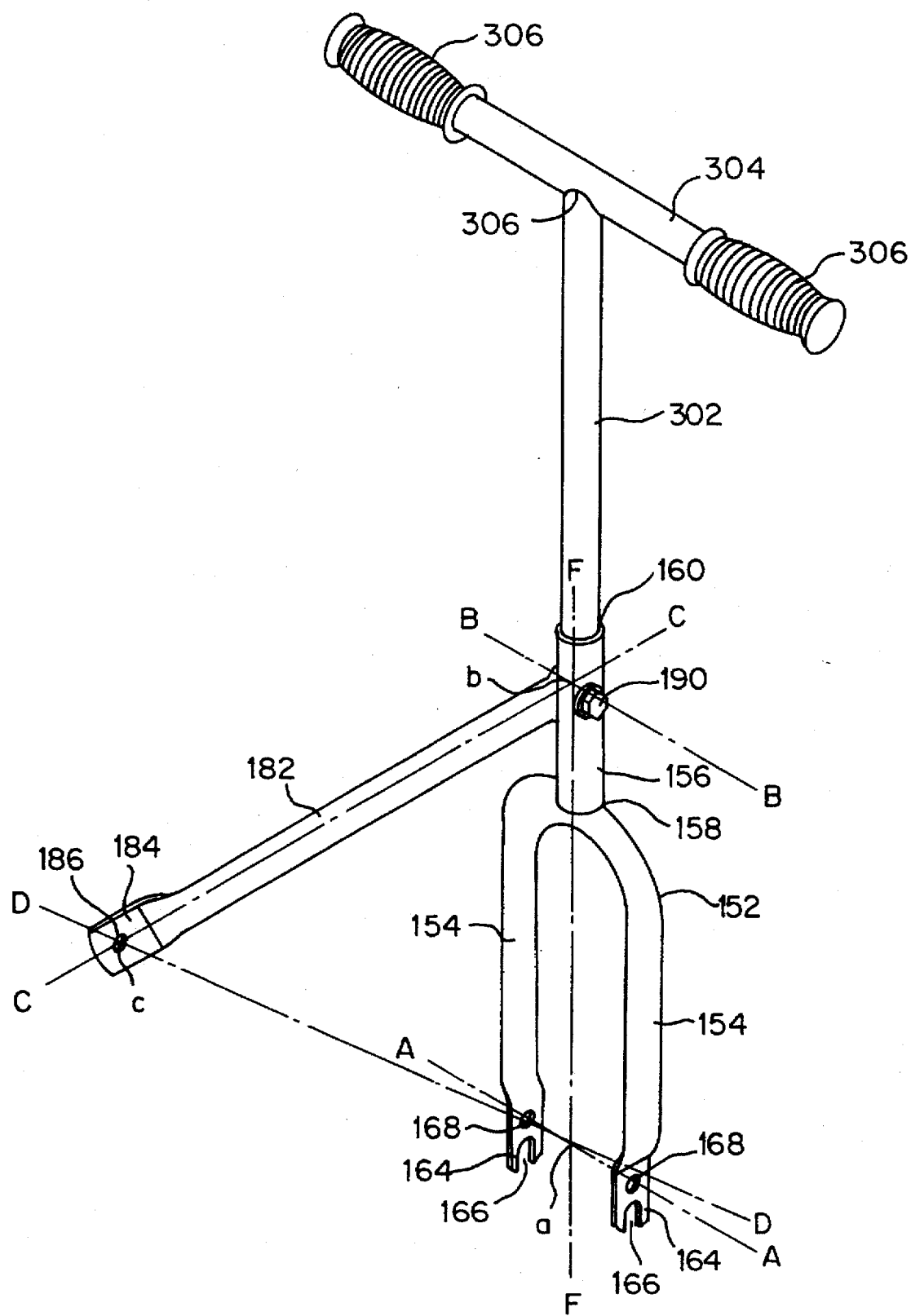
FIG. 3 is a perspective view, generally similar to that of FIG. 2, of a second preferred embodiment which has a double-grip handle that may be particularly suitable for a child acting as the helper for another child learning to ride the bicycle or when the learner is relatively heavy.
Figure 4:
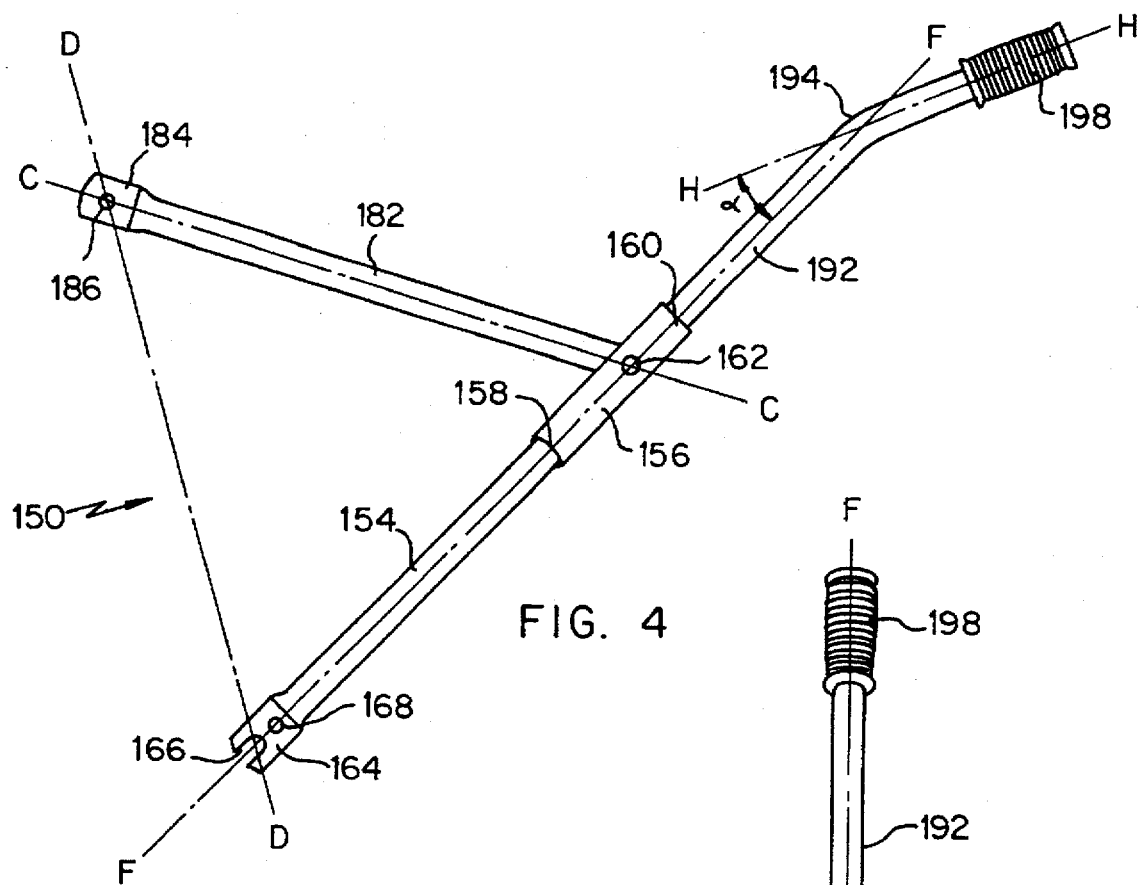
FIG. 4 is a side elevation view of the preferred embodiment per FIG. 2.
Figure 5:
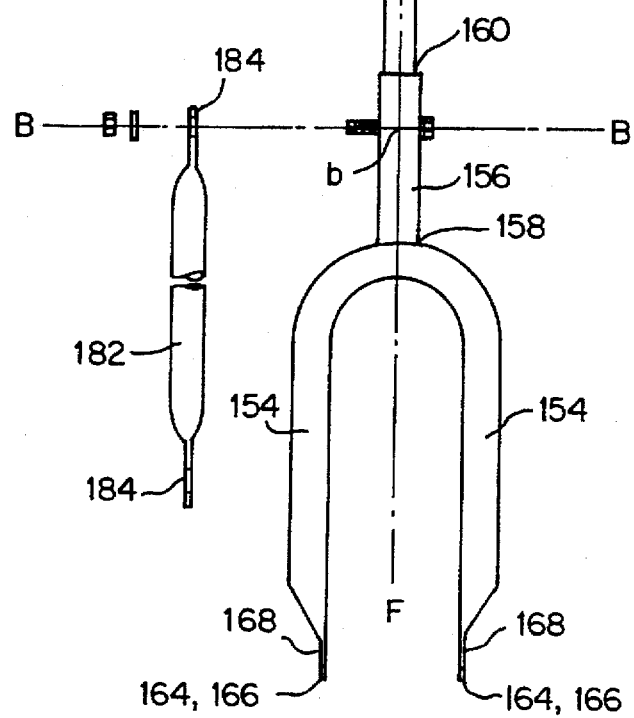
FIG. 5 is a front elevation view of the embodiment per FIG. 2, in partially exploded form, to explain the preferred manner of simultaneously connecting the three principal elements to each other with just one conventional bolt, washer and nut assembly.

FIG. 3 relates to a second preferred embodiment, one which may be deemed more suitable if the helper is a young child or the learner is a relatively heavy individual. In this embodiment, the third element has a first straight tubular portion 302 having an outside diameter slightly smaller than the straight tubing 156 so that it may be slidingly received therein. This straight tubular portion 302 is provided with a diametral hole at axis B—B so that a conventional bolt of a bolt, washer and nut assembly 190 may pass through and also connect second element 182 at its outboard end to first element 152. At the upper end of straight tubular portion 302 is provided a transverse tubular portion 304 preferably welded at weld 306 at its center. Transverse tubular portion 304 is provided with two end grips 306, 306 each of which may be similar to grip 198 of the first preferred embodiment.

Reference to FIG. 1 will clarify how the distal upper end of third element 192 in the first embodiment is above and to the rear of the rear wheel of the bicycle. The only difference between the first and second embodiments is in the provision of a transverse portion 304 and two grips 306, 306 and it should be easy to visualize how such an embodiment would be accessed when mounted on the bicycle, i.e., the two grips 306, 306 would be above and to the rear of the bicycle for the helper to grasp with both hands. When the helper is a child, and has not gained his or her full adult height, such an embodiment might be easier to use since both hands would be employed in providing stability to the learner. Similarly, if the learner were a relatively heavy child or adult, even an adult helper might prefer to grasp the device with both hands while remaining behind the bicycle, and would be able to push the learner on an uphill road and also be able to provide lateral forces to stabilize the learner against tipping over.

As a practical matter, either embodiment could be sold separately or a complete package including one each of the single grip and the double grip elements could be included along with one each of the first and second elements in a package. This would increase the cost of the total package but would greatly increase its possible utility. Most people are likely to purchase the device for their first child and, thereafter, may plan to disassemble, repack and store the device for possible use with a later-born child or to lend it to someone else. Since children come in a variety of sizes and weights, the provision of both types of third element may, in fact, be considered commercially desirable.

Finally, note that although all of the principal steel elements can be readily chromed or provided black powder finish, and would therefore be acceptable with most bicycles, it should also be easy to provide the elements in any colors which match, complement, or stand out against the colors of commercially-sold bicycles. In other words, the outside finish of the principal elements is a matter of design choice and is not critical.

Although drawn steel tubing may be the preferred material for making elements 152, 182 and 192 it is not critical, i.e., other materials and non-hollow forms may also be suitable. When steel tubing is used as described above, a suitable but not critical diameter is about 1 in. and a preferred thickness is about 0.060 in. The overall height of the grip 198 or grips 306, 306 above the ground, with the bicycle upright, is preferably in the range 36–42 in. Second element 182, between the centers of holes 186, 186 therein, is preferably in the range 24–30 in. The angle "α" is best selected to allow grip 198 to be almost horizontal.

Although the present invention has been described and illustrated in detail, it should be clearly understood that the same is by way of illustration and example only and is not to be taken by way of limitation, the spirit and scope of the present invention being limited only by the terms of the appended claims.

What is claimed is:

1. A device attachable to a bicycle to enable a helper walking or running alongside or behind the bicycle to provide stability and support to a rider learning to ride the bicycle, the device comprising:

a first element comprising a pair of arms having distal ends formed to attach to a rear axle of the bicycle and an oppositely directed connection arm;

a second element having a first end formed to attach to the bicycle beneath a seat thereof and a second end formed to attach to the connection arm of the first element; and a third element having a connection end formed to attach to the connection arm of the first element and a graspable distal end, wherein the first element is of substantially tubular integrated form, wherein said pair of arms are arms of a tube bent to a U-shape, wherein the connection arm is also tubular and is welded to an outside center of the U-shape, and wherein each of the distal ends of the pair of arms is flattened and formed to have an open end slot of a width sized to receive the rear axle.

2. The device according to claim 1, wherein:

the third element is tubular and has an outside diameter sized to be closely and slidingly received into the connection arm of the first element, and has an elbow such that a distal end is inclined at a selected angle relative to the connection end.

3. The device according to claim 2, wherein:

the second element is formed of a tube flattened at both ends, each flattened end being provided with a hole for connection thereat.

4. The device according to claim 3, further comprising:

a first connection means for simultaneously connecting the first, second and third elements to each other.

5. The device according to claim 4, further comprising:

a second connection means for connecting the pair of arms of the first element to the rear axle of the bicycle following the reception of respective portions of the rear axle into the open slots.

* * * * *